(12) United States Patent
Schmidt

(10) Patent No.: US 10,647,023 B2
(45) Date of Patent: May 12, 2020

(54) METHOD AND MATERIAL FOR ADDITIVELY MANUFACTURING A CERAMIC CONTAINING ARTICLE

(71) Applicant: United Technologies Corporation, Farmington, CT (US)

(72) Inventor: Wayde R. Schmidt, Pomfret Center, CT (US)

(73) Assignee: United Technologies Corporation, Farmington, CT (US)

( * ) Notice: Subject to any disclaimer, the term of this patent is extended or adjusted under 35 U.S.C. 154(b) by 204 days.

(21) Appl. No.: 15/671,642

(22) Filed: Aug. 8, 2017

(65) Prior Publication Data

US 2019/0047173 A1    Feb. 14, 2019

(51) Int. Cl.

| | |
|---|---|
| *B28B 1/00* | (2006.01) |
| *C04B 35/50* | (2006.01) |
| *C04B 35/56* | (2006.01) |
| *C04B 35/626* | (2006.01) |
| *C04B 35/58* | (2006.01) |

(Continued)

(52) U.S. Cl.
CPC .............. *B28B 1/001* (2013.01); *B29C 64/106* (2017.08); *B29C 64/165* (2017.08); *B33Y 10/00* (2014.12); *B33Y 80/00* (2014.12); *C04B 35/01* (2013.01); *C04B 35/053* (2013.01); *C04B 35/111* (2013.01); *C04B 35/14* (2013.01); *C04B 35/46* (2013.01); *C04B 35/486* (2013.01); *C04B 35/50* (2013.01); *C04B 35/5154* (2013.01); *C04B 35/56* (2013.01); *C04B 35/58* (2013.01); *C04B 35/5805* (2013.01); *C04B 35/6269* (2013.01); *C04B 35/62218* (2013.01); *C04B 35/632* (2013.01); *C04B 35/638* (2013.01); *C04B 35/64* (2013.01); *B29K 2083/00* (2013.01); *B29K 2105/16* (2013.01); *B29K 2509/02* (2013.01); *C04B 2235/3213* (2013.01);

(Continued)

(58) Field of Classification Search
CPC ..................................................... B29C 64/165
See application file for complete search history.

(56) References Cited

U.S. PATENT DOCUMENTS

| | | | |
|---|---|---|---|
| 5,632,925 | A | 5/1997 | Moulton et al. |
| 7,927,538 | B2 | 4/2011 | Moszner et al. |

(Continued)

FOREIGN PATENT DOCUMENTS

| | | |
|---|---|---|
| EP | 3009416 | 4/2016 |

OTHER PUBLICATIONS

Travitzky, Nahum, et al., Additive Manufacturing of Ceramic-Based Materials, Advanced Engineering Materials 2014, vol. 16, No. 6, pp. 729-754.

(Continued)

*Primary Examiner* — Joseph A Miller, Jr.
(74) *Attorney, Agent, or Firm* — Carlson, Gaskey & Olds, P.C.

(57) ABSTRACT

A method for additively manufacturing a ceramic containing article includes selecting a ceramic precursor and a curable resin, determining a ratio of the ceramic precursor to the curable resin required to achieve a desired ceramic microstructure, mixing the ceramic precursor and the curable resin according to the determined ratio, and iteratively building an article by sequentially applying a layer of the mixture and curing the layer using an additive manufacturing machine.

10 Claims, 1 Drawing Sheet

(51) Int. Cl.
*C04B 35/46* (2006.01)
*C04B 35/515* (2006.01)
*C04B 35/01* (2006.01)
*C04B 35/486* (2006.01)
*C04B 35/053* (2006.01)
*C04B 35/111* (2006.01)
*C04B 35/14* (2006.01)
*B33Y 10/00* (2015.01)
*B33Y 80/00* (2015.01)
*B29C 64/106* (2017.01)
*B29C 64/165* (2017.01)
*C04B 35/622* (2006.01)
*C04B 35/632* (2006.01)
*C04B 35/638* (2006.01)
*C04B 35/64* (2006.01)
*B29K 83/00* (2006.01)
*B29K 105/16* (2006.01)
*B29K 509/02* (2006.01)

(52) U.S. Cl.
CPC .. *C04B 2235/3229* (2013.01); *C04B 2235/48* (2013.01); *C04B 2235/483* (2013.01); *C04B 2235/6026* (2013.01)

(56) References Cited

U.S. PATENT DOCUMENTS

| 2009/0020921 | A1* | 1/2009 | Cakmak | B29C 39/14 264/484 |
| 2016/0107331 | A1 | 4/2016 | Schmidt | |
| 2017/0008236 | A1 | 1/2017 | Easter et al. | |
| 2017/0137955 | A1 | 5/2017 | Hofmann et al. | |

OTHER PUBLICATIONS

Eckel, Zak C., et al., Additive Manufacturing of polymer-derived ceramics, Science Magazine, Jan. 2016, vol. 351 Issue 62 68, pp. 58-62, retrieved from http://science.sciencemag.org/ on Jun. 30, 2017.

European Search Report for Application No. 18187076.7 dated Dec. 14, 2018.

* cited by examiner

METHOD AND MATERIAL FOR ADDITIVELY MANUFACTURING A CERAMIC CONTAINING ARTICLE

TECHNICAL FIELD

The present disclosure relates generally to additive manufacturing, and more specifically to a method and material for additively manufacturing a ceramic containing article.

BACKGROUND

Additive manufacturing processes are used to create three dimensional articles having unique and complex geometries that are either prohibitively expensive to create, or impossible to create, using alternative manufacturing processes. Typical additive manufacturing processes apply thermal energy to a material bed to iteratively create layers of a component out of the base material. By way of example, plastics and metals are frequently utilized in additive manufacturing as the base material.

In some cases, such as for components to be utilized in a gas turbine engine, the component must be suitable for exposure to extreme thermal conditions and extreme thermal cycling. Specific examples of such components include ceramic matrix composites, ceramic vanes, blade outer air seals, and the like. One method for creating articles suitable for such applications is the utilization of a ceramic, or a ceramic containing, material.

Traditional machining methods for manufacturing ceramic containing articles including complex shapes are complex, require extreme temperatures, and utilize multiple iterative processing steps. Further, complex shapes, such as interior geometries, end cuts, and the like are prohibitively expensive and time consuming to create.

SUMMARY OF THE INVENTION

An exemplary method for additively manufacturing a ceramic containing article includes selecting a ceramic precursor and a curable resin, determining a ratio of the ceramic precursor to the curable resin required to achieve a desired ceramic microstructure, mixing the ceramic precursor and the curable resin according to the determined ratio, and iteratively building an article by sequentially applying a layer of the mixture and curing the layer using an additive manufacturing machine.

In another example of the above described exemplary method for additively manufacturing a ceramic containing article the ceramic precursor comprises an inorganic polymer.

In another example of any of the above described exemplary methods for additively manufacturing a ceramic containing article the inorganic polymer comprises one of polysilazanes, polycarbosilanes, polysilanes, polysiloxanes, polycarbosiloxanes, polyaluminosilazanes, polyaluminocarbosilanes, and boropolycarbosiloxanes.

In another example of any of the above described exemplary methods for additively manufacturing a ceramic containing article the inorganic polymer is a metal-modified preceramic polymer.

In another example of any of the above described exemplary methods for additively manufacturing a ceramic containing article the inorganic polymer is one of a solid and a liquid.

In another example of any of the above described exemplary methods for additively manufacturing a ceramic containing article the curable resin is an organic resin.

In another example of any of the above described exemplary methods for additively manufacturing a ceramic containing article the organic resin is a radiation cured resin.

In another example of any of the above described exemplary methods for additively manufacturing a ceramic containing article curing the layer comprises applying at least one of a light, ultra-violet (UV) radiation, infra-red (IR) radiation, thermal radiation, microwave radiation and plasma radiation to a material bed including at least one layer of the mixed ceramic precursor and curable resin.

Another example of any of the above described exemplary methods for additively manufacturing a ceramic containing article further includes determining a miscibility of the ceramic precursor and curable resin and wherein mixing the ceramic precursor and the curable resin further comprises adding at least one coupling agent in response to the ceramic precursor and the curable resin being at most partially miscible.

In another example of any of the above described exemplary methods for additively manufacturing a ceramic containing article the coupling agent is a surfactant including one of an oligomer, one of a block copolymer modifier and a terpolymer modifier, and a silicon-containing containing coupling agent which contains two types of reactivity in the same molecule, such as silanes modified with functional groups.

In another example of any of the above described exemplary methods for additively manufacturing a ceramic containing article the surfactant comprises at least one of alkoxy, acetoxy, vinyl, allyl, epoxy, styryl, methacryloxy, acryloxy, amino, imido, ureide, mercapto and isocyanate groups.

In another example of any of the above described exemplary methods for additively manufacturing a ceramic containing article mixing the ceramic precursor and the curable resin according to the determined ratio further comprises adding at least one non-coupling agent additive.

In another example of any of the above described exemplary methods for additively manufacturing a ceramic containing article iteratively building the article by sequentially applying the layer of the mixture and curing the layer using the additive manufacturing machine further comprises altering a phase of the ceramic precursor such that the ceramic precursor is converted into a ceramic.

In another example of any of the above described exemplary methods for additively manufacturing a ceramic containing article altering the phase is achieved via a controlled thermal decomposition.

Another example of any of the above described exemplary methods for additively manufacturing a ceramic containing article further includes converting the ceramic precursor into a ceramic material by altering the phase(s) of the ceramic precursor using a controlled decomposition process.

In one exemplary embodiment an additively manufactured article includes a three dimensional article including a cured resin structure and a ceramic precursor.

In another example of the above described additively manufactured article the cured resin and the ceramic precursor are part of a homogenous mixture.

In another example of any of the above described additively manufactured articles the homogenous mixture includes at least one additive.

In another example of any of the above described additively manufactured articles the ceramic precursor is an inorganic polymer and wherein the curable resin is an organic resin.

In another example of any of the above described additively manufactured articles the three dimensional article is configured to form one of an oxide including one of silica, hafnia, zirconia, alumina, ceria, magnesia, strontia, titania and a non-oxides including one of a nitride, a carbide, a boride, a phosphide and a carbonitride.

These and other features of the present invention can be best understood from the following specification and drawings, the following of which is a brief description.

DETAILED DESCRIPTION OF AN EMBODIMENT

Figure 1:
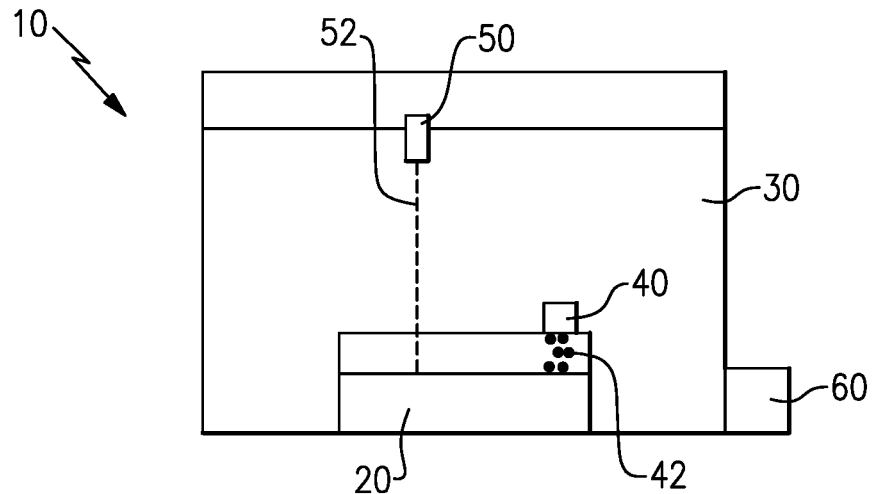
FIG. 1 schematically illustrates an exemplary additive manufacturing machine for creating a ceramic containing article.

FIG. 1 schematically illustrates an exemplary additive manufacturing machine 10 adapted to manufacture a ceramic containing article. The additive manufacturing machine 10 includes a material bed 20, such as a powder bed, disposed within a chamber 30. In alternative examples, the material bed 20 can be a liquid resin reservoir such as would be used in a stereolithography additive manufacturing process. A material dispenser 40 dispenses a base material 42 into or onto the material bed 20 as needed. A radiation source 50, such as a laser, lamp, projector, light emitting diodes, microwave, or the like, is moveably disposed above the material bed 20, and applies precision radiation 52 to the material in the material bed. In one example, the relative distance between the material bed 20 and the radiation source 50 is variable. A controller 60 is connected to the chamber 30 and controls the operations of the additive manufacturing machine 10 according to a preprogrammed schedule in order to create a desired part.

The radiation 52 causes the material in the material bed 20 to harden, increase in viscosity, or solidify, at the point of contact and within an effective volume specific to the interaction between the radiation 52 and the material in the bed 20. By scanning the radiation 52 along the material bed 20 in a pattern controlled by the controller 60, a complex layer is created. Once the layer has been created, additional material 42 is applied to the material bed 20 or provided by the reservoir, and a new layer is created on top of the previous layer. The creation of each layer also fuses that layer to any previous layers resulting in a single complex three dimensional component being manufactured. In some examples, an additional support structure is manufactured along with the created component and then removed manually, chemically, thermally or via milling or any other machining process or combinations of processes after the manufacturing process. Alternatively, any similar process or structure for additively manufacturing an article from a base material can be utilized to create the ceramic containing article described below.

To create ceramic containing articles, existing additive manufacturing processes utilize ceramic particulates dispersed as a slurry in a photoactive resin, or ceramic powder beds bound together by an added organic binder. In both cases, the process utilizes an existing ceramic particulate or powder and does not alter the phase of the ceramic included within the material bed.

While illustrated herein as an exemplary additive manufacturing machine, it should be appreciated that the following materials and methods can be utilized in conjunction with any known additive manufacturing process or could be adapted for utilization with any new additive manufacturing processes.

Figure 2:
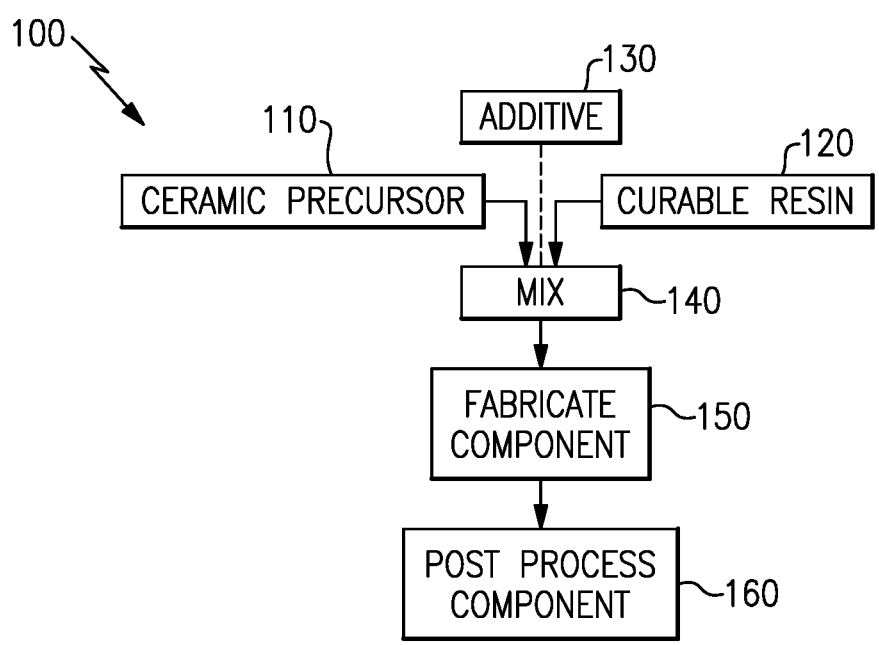
FIG. 2 schematically illustrates a first exemplary process for creating an additive manufacturing material mixture.

With continued reference to FIG. 1, FIG. 2 schematically illustrates an example process 100 for creating a ceramic containing article via additive manufacturing. Exemplary, but non limiting ceramics of particular interest include oxides such as silica, hafnia, zirconia, alumina, ceria, magnesia, strontia, titania and the like; non-oxides such as nitrides, carbides, borides, phosphides and carbonitrides including silicon nitride, silicon carbide, hafnium carbide, zirconium carbide, aluminum nitride and boron nitride; and oxycarbides or oxynitrides including silicon oxycarbide and silicon oxynitride. Initially, a ceramic precursor 110, and a curable resin 120, are selected. The ceramic precursor 110 can be any preceramic inorganic polymer designed to produce a desired ceramic phase, or multiple desired ceramic phases, upon conversion to ceramic via a controlled thermal decomposition resulting from an exposure to a form of radiation and/or a controlled atmosphere. Exemplary ceramic precursors 110 include polysilazanes, polycarbosilanes, polysilanes, polysiloxanes, polycarbosiloxanes, polyaluminosilazanes, polyaluminocarbosilanes, boropolycarbosiloxanes and the like, including metal-modified preceramic polymers. The ceramic precursor 110 in some examples takes the form of a powder precursor. In alternative examples, the ceramic precursor 110 can take the form of a liquid precursor. Blends of ceramic precursors are also contemplated.

Non-limiting examples of curable resins 120 include photopolymers or light-activated resins whose monomers/oligomers can be photo-initiated via ionic or free radical mechanisms. Examples of curable resins 120 include mono-, bi- and multifunctional acrylates and methacrylates, urethane acrylates, epoxies, urethanes and esters and blends thereof. Hybrid inorganic/organic curable resins such as UV-curable silicone-based polymers are also contemplated.

The curable resin 120 is typically an organic resin selected based on the curing process of the additive manufacturing machine to be used, the desired composition and microstructure of the resultant ceramic containing article, and any number of other factors. By utilizing a ceramic precursor 110 as well as a curable organic resin 120, an article can be generated that includes beneficial ceramic char within the microstructure after the curing process of the additive manufacturing method.

In some examples, the selected ceramic precursor 110 and the selected curable resin 120 are fully miscible. In other words, the ceramic precursor 110 and the curable resin 120 can form a homogenous mixture at all concentrations without the addition of any additives. In such an example, no coupling agent or additives are required to fully and homogeneously mix the ceramic precursor 110 and the curable resin 120. In alternative examples, the ceramic precursor 110 and the curable resin 120 are not fully miscible, and a coupling agent or compatibilizer is introduced as an additive 130.

An exemplary coupling agent 130 is a surfactant material, such as an oligomer or polymer modifier (including block co- and terpolymers) or a silicon-containing coupling agent which contain two types (organic and inorganic) of reactivity in the same molecule, such as silanes modified with functional groups including, but not limited to alkoxy, acetoxy, vinyl, allyl, epoxy, styryl, methacryloxy, acryloxy, amino, imido, ureide, mercapto or isocyanate groups, with the material of the specific coupling agent 130 depending on miscibility of the ceramic precursor 110 and the curable resin 120, as well as the chemical properties leading to their lack of full miscibility.

In yet further examples, additional additives, such as metals, ceramics, glass and carbon, can be included within the mixture to provide additional functionality, as well as additional structural properties in the final ceramic phase of the material. The additional additives can be generally amorphous, semicrystalline, turbostratic or crystalline in nature.

A ratio of ceramic precursor 110 to curable resin 120, as well as the presence of any additives or coupling agents, determines the ceramic composition and microstructure of the resultant ceramic containing article. As is known in the art, different compositions and microstructures can provide different benefits depending on the specific application of the ceramic containing article. As such, one of skill in the art can tailor the specific composition and microstructure to the specific application by adjusting the ratio of ceramic precursor 110 to curable resin 120. The specific composition and microstructure achieved for a given ratio, additive(s), and curing method can be determined using experimentation performed by one of skill in the art.

Once all of the included materials are selected, as well as their form and ratios, the materials are mixed in a mixing step 140. The resultant mixture includes a homogenous mixture of ceramic precursor 110 and curable resin 120, and can be utilized as the material 42 within the material bed 20 for an additive manufacturing process. The mixture is then utilized to fabricate the ceramic containing article according to an additive manufacturing process in a fabricate component step 150.

During the additive manufacturing process, the radiation 52 can take the form of light, such as from a laser source, ultra-violet (UV) radiation, infra-red (IR) radiation, thermal, microwave radiation, plasma radiation or any other similar radiation source or combination of sources. The radiation 52 is applied as described with regards to FIG. 1, and causes the curable resin 120 portion of the mixture to cure in the three dimensional form of the desired article.

Once the three dimensional form has solidified, the component is removed from the additive manufacturing machine 10, and a post processing procedure 160 is applied to the component. The post processing procedure 160 converts the ceramic precursor 110 into a ceramic material by altering the phase(s) of the ceramic precursor 110 using a controlled decomposition process selected from one or more of thermal, barometric and atmospheric processes. By way of example, the post processing procedure 160 can apply controlled thermal conversion resulting in a known rate and quantity of mass loss, followed by structural alteration such as a densification or sintering process and one or more crystallization steps, resulting in the creation of the desired ceramic phase, or phases in the desired microstructure, from the ceramic precursor 110 portion of the mixture. By using an organic curable resin, a beneficial ceramic char can be generated to provide desired compositional or structural modifications during the post processing procedure 160.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for additively manufacturing a ceramic containing article comprising:
   selecting a ceramic precursor and a curable resin, the ceramic precursor comprises a metal-modified preceramic polymer;
   determining a ratio of the ceramic precursor to the curable resin required to achieve a desired ceramic microstructure;
   mixing the ceramic precursor and the curable resin according to the determined ratio; and
   iteratively building an article by sequentially applying a layer of the mixture and curing the layer using an additive manufacturing machine.

2. The method of claim 1, wherein the metal-modified preceramic polymer comprises a material selected from polysilazanes, polycarbosilanes, polysilanes, polysiloxanes, polycarbosiloxanes, polyaluminosilazanes, polyaluminocarbosilanes, and boropolycarbosiloxanes.

3. The method of claim 1, wherein the metal-modified preceramic polymer is one of a solid and a liquid.

4. The method of claim 1, wherein the curable resin is an organic resin.

5. The method of claim 4, wherein the organic resin is a radiation cured resin.

6. The method of claim 5, wherein curing the layer comprises applying at least one of a light, ultra-violet (UV) radiation, infra-red (IR) radiation, thermal radiation, microwave radiation and plasma radiation to a material bed including at least one layer of the mixed ceramic precursor and curable resin.

7. The method of claim 1, further comprising determining a miscibility of the ceramic precursor and curable resin and wherein mixing the ceramic precursor and the curable resin further comprises adding at least one coupling agent in response to the ceramic precursor and the curable resin being at most partially miscible.

8. The method of claim 7, wherein the coupling agent is a surfactant selected from the list of an oligomer, a block copolymer modifier, a terpolymer modifier, and a silicon-containing coupling agent which contains two types of reactivity in the same molecule.

9. The method of claim 8, wherein the surfactant comprises at least one of alkoxy, acetoxy, vinyl, allyl, epoxy, styryl, methacryloxy, acryloxy, amino, imido, ureide, mercapto and isocyanate groups.

10. The method of claim 1, wherein mixing the ceramic precursor and the curable resin according to the determined ratio further comprises adding at least one non-coupling agent additive.

* * * * *